United States Patent
Itabashi et al.

(10) Patent No.: US 10,302,436 B2
(45) Date of Patent: May 28, 2019

(54) PATH SEARCHING APPARATUS, PATH SEARCHING METHOD, AND RECORDING MEDIUM

(71) Applicant: SUBARU CORPORATION, Tokyo (JP)

(72) Inventors: Naoaki Itabashi, Tokyo (JP); Satoshi Okada, Tokyo (JP); Akihiro Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 56 days.

(21) Appl. No.: 15/371,796

(22) Filed: Dec. 7, 2016

(65) Prior Publication Data

US 2017/0199041 A1    Jul. 13, 2017

(30) Foreign Application Priority Data

Jan. 8, 2016  (JP) .................................. 2016-002261

(51) Int. Cl.
*G08G 5/00* (2006.01)
*G01C 21/20* (2006.01)

(52) U.S. Cl.
CPC ........... *G01C 21/20* (2013.01); *G08G 5/0008* (2013.01); *G08G 5/0013* (2013.01); *G08G 5/0021* (2013.01); *G08G 5/0039* (2013.01); *G08G 5/0052* (2013.01); *G08G 5/0078* (2013.01); *G08G 5/0086* (2013.01); *G08G 5/0091* (2013.01)

(58) Field of Classification Search
CPC .... G01C 21/02; G08G 5/0008; G08G 5/0013; G08G 5/0021; G08G 5/0039; G08G 5/0052; G08G 5/0078; G08G 5/0086; G08G 5/0091

USPC ........................................................ 701/400
See application file for complete search history.

(56) References Cited

U.S. PATENT DOCUMENTS

| 8,843,303 B1* | 9/2014 | Young ................. G08G 5/0039 701/122 |
| 2008/0208474 A1* | 8/2008 | Wilson .................... G01W 1/10 702/3 |

FOREIGN PATENT DOCUMENTS

| JP | 2015-001377 A | 1/2015 |
| JP | 2015001377 | * 1/2015 |

OTHER PUBLICATIONS

Office Action issued in corresponding Japanese Patent Application No. 2016-002261, dated Dec. 5, 2017.

(Continued)

*Primary Examiner* — Maceeh Anwari
(74) *Attorney, Agent, or Firm* — McDermott Will & Emery LLP

(57) ABSTRACT

A path searching apparatus includes: a path searching unit that searches for an optimal path of a movable body that performs traveling from a start node to a goal node by performing a path searching process based on A-Star algorithm, and a predicting unit that predicts a surrounding situation of the movable body at each of times in future. The path searching unit determines whether a first surrounding situation involves a change from a second surrounding situation, on a basis of the predicted surrounding situation, and upon determining that the first surrounding situation involves the change, updates an estimated smallest cost value h* of a node on which the searching has been already performed, on a basis of the first surrounding situation.

7 Claims, 5 Drawing Sheets

(56) References Cited

OTHER PUBLICATIONS

Choset, Howie, Robotic Motion Planning: A* and D* Search, Robotics Institute 16-735, <URL: http://www.cs.cmu.edu/~motionplanning/lecture/AppH-astar-dstar_howie.pdf>, 132 pgs. Retrieved from the Internet on Jan. 7, 2016.

* cited by examiner

PATH SEARCHING APPARATUS, PATH SEARCHING METHOD, AND RECORDING MEDIUM

CROSS-REFERENCE TO RELATED APPLICATIONS

The present application claims priority from Japanese Patent Application No. 2016-002261 filed on Jan. 8, 2016, the entire contents of which are hereby incorporated by reference.

BACKGROUND

The technology relates to a technique of searching for a path by A-Star algorithm. In particular, the technology relates to a technique especially useful in searching for an optimal path even when a surrounding situation of a movable body involves a change.

A-Star algorithm has been widely used as a method of searching for various paths such as a flight path of an aircraft.

A-Star algorithm is a searching algorithm that sequentially performs searching, from a start node, for a node that minimizes a value of cost f*(n) expressed by the following expression, and thereby determines an optimal path.

$$f*(n)=g*(n)+h*(n)$$

where g*(n) is an estimated smallest cost value of a path from the start node to a node "n" on which the searching is being currently performed, and h*(n) is an estimated smallest cost value of a path from the node "n" to a goal node.

It is possible, with the foregoing algorithm, to update the estimated smallest cost value g*(n) during the searching and thereby make the estimated smallest cost value g*(n) closer to an actual smallest cost value g(n). It is to be noted that the term "estimated" value used herein refers to a provisional value related to a node on which the searching is being currently performed.

In contrast, the estimated smallest cost value h*(n) is an estimated value in a literal sense. Upon using A-Star algorithm, an optimal solution is guaranteed when the estimated smallest cost value h*(n) is smaller than an actual smallest cost value h(n) of the path from the node "n" to the goal node.

Hence, the optimal solution is not guaranteed when the condition h*(n)<h(n) that the estimated smallest cost value h*(n) is smaller than the actual smallest cost value h(n) is not satisfied, for example, attributed to a change in the surrounding situation of the movable body due to a factor such as a change in location of a goal during the searching.

To address the foregoing issue, Howie Choset. "Robotic Motion Planning: A* and D* Search" [online]. Robotics Institute. retrieved on Jan. 7, 2016 from the Internet: <URL: http://www.cs.cmu.edu/18motionplanning/lecture/AppH-astar-dstar_howie.pdf> discloses a technique in which, when a new hindrance becomes present during the searching, the smallest cost value h(n) of a path from a node on which the searching has been already performed to the goal node is updated with a new value, and the optimal path from the node on which the searching is being currently performed to the goal node is thereby determined efficiently.

SUMMARY

The technique disclosed in Howie Choset. "Robotic Motion Planning: A* and D* Search" allows for determination of an optimal alternative path from a point in the middle of the path at which a change in path has become necessary. However, it may be difficult to determine an optimal path as a whole that leads from the start to the goal. In other words, it has been difficult to search for the optimal path in a case where a surrounding situation of a movable body involves a change.

It is desirable to allow for searching for an optimal path even in a case where a surrounding situation of a movable body involves a change.

An aspect of the technology provides a path searching apparatus. The path searching apparatus includes a path searching unit and a predicting unit. The path searching unit searches for an optimal path of a movable body that performs traveling from a start node to a goal node by sequentially performing searching, from the start node, for a node that minimizes a value of f*(n), and thereby determining the optimal path of the movable body. The value of f*(n) is sum of an estimated smallest cost value g*(n) of a path from the start node to a node "n" on which the searching is being currently performed and an estimated smallest cost value h*(n) of a path from the node "n" to the goal node. The predicting unit predicts a surrounding situation of the movable body at each of a plurality of times that are in future of a time at which the movable body has started performing the traveling. The path searching unit determines whether a first surrounding situation involves a change from a second surrounding situation on a basis of the surrounding situation at the times in the future predicted by the predicting unit. The first surrounding situation is the surrounding situation at a time at which the movable body is to arrive at a node on which the searching is being currently performed. The second surrounding situation is the surrounding situation at a time at which the movable body is to arrive at a node that is located upstream in a path from the node on which the searching is being currently performed. Upon determining that the first surrounding situation involves the change from the second surrounding situation, the path searching unit updates an estimated smallest cost value h* of a node on which the searching has been already performed, on a basis of the first surrounding situation.

An information acquiring unit and a memory may be further provided. The information acquiring unit may acquire surrounding information on the surrounding situation of the movable body. The memory may store a probability model related to the surrounding situation of the movable body. The predicting unit may predict the surrounding situation of the movable body at each of the times in the future on a basis of the surrounding information and the probability model.

The movable body may be an aircraft. The change, from the second surrounding situation, involved in the first surrounding situation may include one or both of a change in risk to flight safety and a change in location of the goal node.

An aspect of the technology provides a path searching method. The method causes a path searching apparatus to: search for an optimal path of a movable body that performs traveling from a start node to a goal node by sequentially performing searching, from the start node, for a node that minimizes a value of f*(n), and thereby determining the optimal path of the movable body, the value of f*(n) being sum of an estimated smallest cost value g*(n) of a path from the start node to a node "n" on which the searching is being currently performed and an estimated smallest cost value h*(n) of a path from the node "n" to the goal node; and predict a surrounding situation of the movable body at each of a plurality of times that are in future of a time at which the movable body has started performing the traveling. The performing of the searching includes: determining whether a first surrounding situation involves a change from a second surrounding situation on a basis of the predicted surrounding situation at the times in the future, the first surrounding situation being the surrounding situation at a time at which the movable body is to arrive at a node on which the searching is being currently performed, and the second surrounding situation being the surrounding situation at a time at which the movable body is to arrive at a node that is located upstream in a path from the node on which the searching is being currently performed; and upon determining that the first surrounding situation involves the change from the second surrounding situation, updating an estimated smallest cost value h* of a node on which the searching has been already performed, on a basis of the first surrounding situation.

An aspect of the technology provides a non-transitory tangible recording medium having a path searching program. The program causes, when executed by a path searching apparatus, the path searching apparatus to function as a path searching unit and a predicting unit. The path searching unit searches for an optimal path of a movable body that performs traveling from a start node to a goal node by sequentially performs searching, from the start node, for a node that minimizes a value of f*(n), and thereby determines the optimal path of the movable body. The value of f*(n) is sum of an estimated smallest cost value g*(n) of a path from the start node to a node "n" on which the searching is being currently performed and an estimated smallest cost value h*(n) of a path from the node "n" to the goal node. The predicting unit predicts a surrounding situation of the movable body at each of a plurality of times that are in future of a time at which the movable body has started performing the traveling. The path searching unit determines whether a first surrounding situation involves a change from a second surrounding situation on a basis of the surrounding situation at the times in the future predicted by the predicting unit. The first surrounding situation is the surrounding situation at a time at which the movable body is to arrive at a node on which the searching is being currently performed. The second surrounding situation is the surrounding situation at a time at which the movable body is to arrive at a node that is located upstream in a path from the node on which the searching is being currently performed. Upon determining that the first surrounding situation involves the change from the second surrounding situation, the path searching unit updates an estimated smallest cost value h* of a node on which the searching has been already performed, on a basis of the first surrounding situation.

An aspect of the technology provides a path searching apparatus. The path searching apparatus includes circuitry that: searches for an optimal path of a movable body that performs traveling from a start node to a goal node by sequentially performing searching, from the start node, for a node that minimizes a value of f*(n), and thereby determines the optimal path of the movable body, the value of f*(n) being sum of an estimated smallest cost value g*(n) of a path from the start node to a node "n" on which the searching is being currently performed and an estimated smallest cost value h*(n) of a path from the node "n" to the goal node; predicts a surrounding situation of the movable body at each of a plurality of times that are in future of a time at which the movable body has started performing the traveling; determines whether a first surrounding situation involves a change from a second surrounding situation on a basis of the predicted surrounding situation at the times in the future, the first surrounding situation being the surrounding situation at a time at which the movable body is to arrive at a node on which the searching is being currently performed, and the second surrounding situation being the surrounding situation at a time at which the movable body is to arrive at a node that is located upstream in a path from the node on which the searching is being currently performed; and upon determining that the first surrounding situation involves the change from the second surrounding situation, updates an estimated smallest cost value h* of a node on which the searching has been already performed, on a basis of the first surrounding situation.

DETAILED DESCRIPTION

One implementation of the technology is described below with reference to the drawings.

[Configuration of Path Searching Apparatus]

First, a configuration of a path searching apparatus 10 according to the present implementation is described with reference to FIG. 1.

Figure 1:
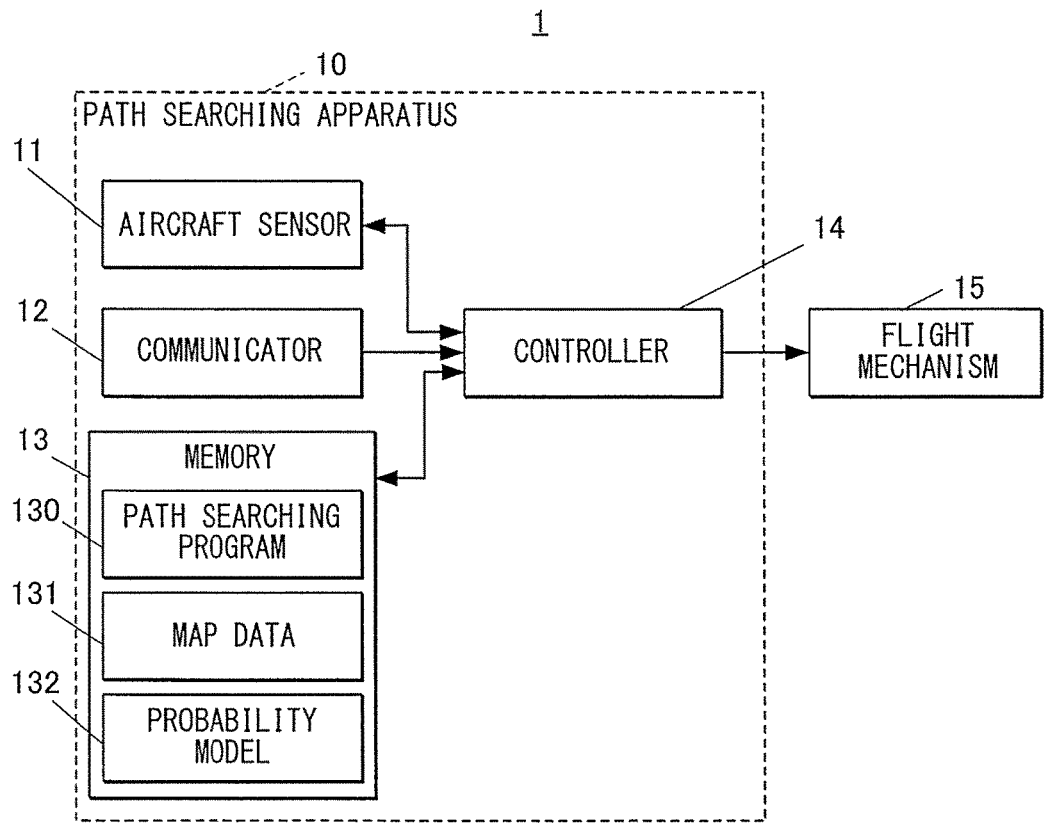
FIG. 1 is a block diagram illustrating an outline configuration of an aircraft according to one implementation of the technology.

FIG. 1 is a block diagram illustrating an outline configuration of an aircraft 1 on which the path searching apparatus 10 may be mounted.

The path searching apparatus 10 may be mounted on the aircraft 1 in the present implementation. The path searching apparatus 10 may alternately be mounted on any other moving body. The path searching apparatus 10 searches for an optimal flight path of the own aircraft by a path searching method based on A-Star algorithm and thereby sets the optimal flight path of the own aircraft.

The aircraft 1 may fly from a traveling start point to a traveling destination point within a region in which a hindrance may be present.

Specifically, the path searching apparatus 10 may include an aircraft sensor 11, a communicator 12, a memory 13, and a controller 14, for example, as illustrated in FIG. 1.

The aircraft sensor 11 may include various sensors such as a sensor that detects a flight state of the aircraft 1 and a sensor that acquires information on a surrounding situation of the aircraft 1. The information on the surrounding situation of the aircraft 1 may be hereinafter referred to as "surrounding information". Examples of the various sensors may include radar, an image sensor (a camera), a gyroscope, a velocity sensor, and a global positioning system (GPS). The aircraft sensor 11 may acquire various pieces of information on the basis of control instructions given by the controller 14, and supply a signal representing the acquired pieces of information to the controller 14.

The communicator 12 may communicate with a control facility on the ground, at the sea, or in the air. The communicator 12 may communicate with another aircraft, etc. The communicator 12 may transmit various signals to and receive various signals from the foregoing control facility, another aircraft, etc. Further, the communicator 12 may be accessible to various pieces of information through connection to a communication network.

The memory 13 may store a program, data, etc., that are used to achieve various functions of the aircraft 1. The memory 13 may also serve as a workspace. The memory 13 may store a path searching program 130 in the present implementation.

The path searching program 130 may cause the controller 14 to execute a path searching process which is described later with reference to FIGS. 2 and 3.

The memory 13 may store map data 131 and various probability models 132 as pieces of information that are necessary to execute the path searching process described later.

The map data 131 may include comprehensive geographic information including terrain information and information on a utilization state of the land. Examples of the terrain information may include information on a mountain and a river. Examples of the information on the utilization state of the land may include information on a road, a railway, and a building. The memory 13 may store at least the map data 131 of a predetermined range including a flight region of the aircraft 1.

The probability model 132 may be related to the surrounding situation of the aircraft 1, and may express rules of a probability of an uncertain matter. The probability model 132 in the present implementation may be related to information on a hindrance such as a traveling velocity, a traveling direction, ability, and performance of the hindrance, weather, etc. The probability model 132 in the present implementation may be set on the basis of terrain, the weather, a pattern, experimental rules, etc.

The controller 14 may perform a central control of each unit included in the aircraft 1. Specifically, the controller 14 may perform a drive control of a flight mechanism 15 including components such as an engine and a control surface actuator, and thereby control the flight of the aircraft 1, for example. Further, the controller 14 may load the program stored in the memory 13, and thereby execute the various processes on the basis of the loaded program.

[Operation of Path Searching Apparatus]

A description is given below of operation of the path searching apparatus 10 performed upon execution of the path searching process, with reference to FIGS. 2 and 3.

Figure 2:
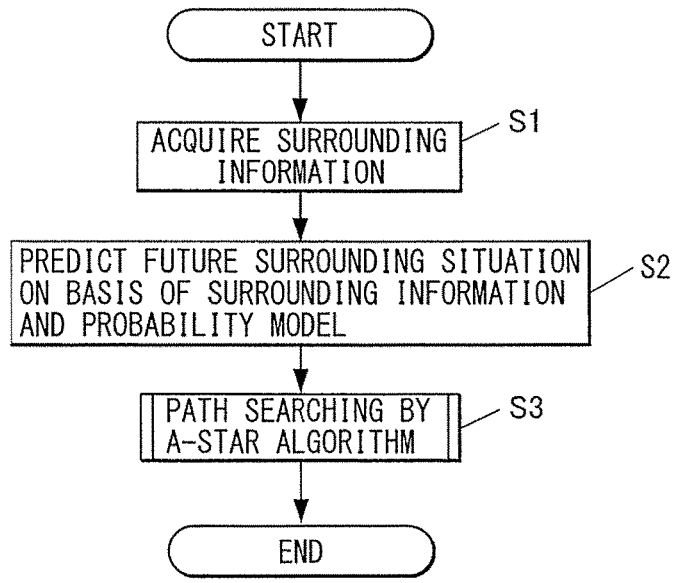
FIG. 2 is a flowchart illustrating an example of a flow of a path searching process.
Figure 3:
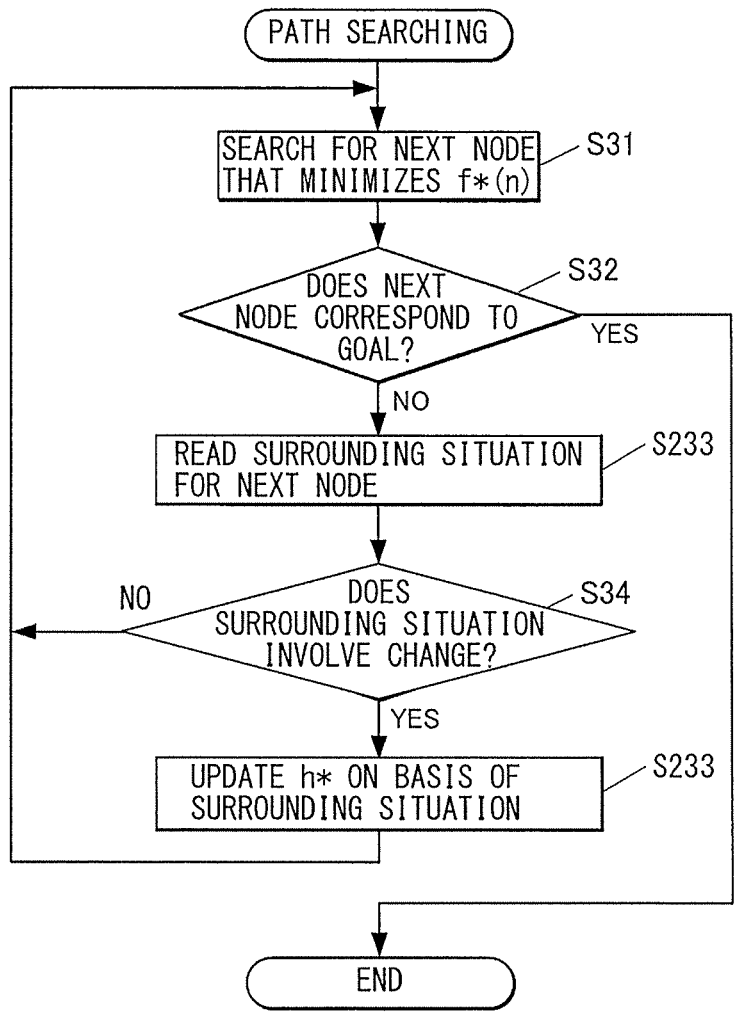
FIG. 3 is another flowchart illustrating an example of the flow of the path searching process.

FIGS. 2 and 3 are each a flowchart illustrating an example of a flow of the path searching process.

The path searching process may be performed to search for a flight path of the aircraft 1 by a path searching method based on A-Star algorithm and thereby set the flight path of the aircraft 1. The controller 14 may read and load the path searching program 130 stored in the memory 13, and thereby execute the path searching process, upon reception of instructions to execute the path searching process through reception of a control order, etc. from a facility on the ground.

Referring to FIG. 2, upon execution of the path searching process, the controller 14 may first acquire the surrounding information of the own aircraft (the aircraft 1) (step S1).

Specifically, the controller 14 may acquire, with the aircraft sensor 11, information such as position information of the own aircraft and position information of another aircraft, and also acquire information such as the weather information with the communicator 12. The controller 14 may store the acquired information in the memory 13.

It is to be noted that the information to be acquired may be basically current information (information at the time of acquiring the information). However, when the information to be acquired includes information on future prediction, the information on the future prediction may be also acquired. The information including the information on the future prediction may be, for example, traveling information of another aircraft, weather information, etc. supplied from a control station.

Thereafter, the controller 14 predicts the surrounding situation of the own aircraft in the future (step S2).

Specifically, the controller 14 may read, from the memory 13, the surrounding information on the surrounding situation acquired in step S1, the probability models 132 corresponding to the read surrounding situation, etc. Further, the controller 14 may run a simulation using the read surrounding information, the read probability models 132, etc., and thereby create a predictable scenario for each of a plurality of times in the future at least until creating the predictable scenario for a predetermined time in the future at which the own aircraft is to arrive at the travel destination point. The simulation may be run by Monte Carlo method, for example. The predictable scenario may be the surrounding situation of the own aircraft that is predicted for corresponding one of the times in the future. The plurality of times in the future may be a time 10 minutes later the current time, a time 20 minutes later the current time, and so on. Thereafter, referring to FIG. 4, etc., the controller 14 may convert a risk to flight safety of the aircraft 1 into a numerical value, and associate the numerical value with the map data 131 to thereby create a risk map M. More in detail, the controller 14 may divide the map data 131 read from the memory 13 into a plurality of cells in a matrix on a horizontal surface. For example, the controller 14 may divide the read map data 131 into a plurality of cells corresponding to respective squares that are arranged in a matrix and each have sides extending in a north-south direction and sides extending in a west-east direction. Further, the controller 14 may convert the risk in each of the cells into a numerical value on the basis of the predictable scenario, and assign the numerical value to the corresponding cell to thereby create the risk map M. The created risk map M may be stored in the memory 13.

The risk map M that includes the risk to the flight safety that is converted into the numerical value to be expressed on the map data 131 may be thus created for each of the times in the future, as a map expressing the surrounding situation of the aircraft 1 in the future.

Upon the creation of the risk map M for each of the times in the future, the controller 14 may also create a current risk map M on the basis of the current surrounding information acquired in step S1.

Thereafter, the controller 14 performs path searching by A-Star algorithm (step S3).

A-Star algorithm is a searching algorithm that sequentially performs searching, from a start node, for a node that minimizes a value of cost f*(n) expressed by the following Expression (1), and thereby determines an optimal path.

$$f^*(n) = g^*(n) + h^*(n) \qquad \text{Expression (1)}$$

where g*(n) is an estimated smallest cost value of a path from the start node to a node "n" on which the searching is being currently performed, and h*(n) is an estimated smallest cost value of a path from the node "n" to a goal node.

Upon using A-Star algorithm, an optimal solution is guaranteed when the estimated smallest cost value h*(n) is smaller than an actual smallest cost value h(n) of the path from the node "n" to the goal node.

Referring to FIG. 3, upon the foregoing path searching, the controller 14 may search for a next node n+1 that minimizes the value of cost f*(n) in nodes adjacent to the node "n" on which the searching is being currently performed, excluding nodes on which the searching has been already performed (step S31). The nodes on which the searching has been already performed are the nodes on the flight path that has been already passed by the aircraft 1. The controller 14 may thus search for the next node n+1 using the risk map M, setting the risk to the flight safety as a travel cost. It is to be noted that each of the nodes corresponds to each of the foregoing cells.

At the beginning of the searching, the traveling start point (the start node) may be set as the node "n".

The risk map M used upon the searching for the next node n+1 may express the surrounding situation at a time at which the own aircraft is to arrive at the node "n", referring to step S33 described later. At the beginning of the searching, the current risk map M (at a time of acquiring information) may be read from the memory 13 and used.

Thereafter, the controller 14 may determine whether the node n+1 is the traveling destination point (the goal node) (step S32). When the controller 14 determines that the node n+1 is the traveling destination point (YES in step S32), the controller 14 may terminate the searching process.

Alternatively, when the controller 14 determines that the node n+1 is not the traveling destination point in step S32 (NO in step S32), the controller 14 may read the surrounding situation of the own aircraft at the node n+1 (step S33).

Specifically, the controller 14 may set or assume the velocity of the own aircraft and thereby calculate a time at which the own aircraft is to arrive at the node n+1. The controller 14 may read the risk map M at the calculated time from the memory 13.

Thereafter, the controller 14 determines whether the surrounding situation at the time at which the own aircraft is to arrive at the node n+1 involves a change from the surrounding situation at a time at which the own aircraft is to arrive at the node "n" (step S34). In other words, the controller 14 determines whether the surrounding situation changes in accordance with passage of time during the traveling of the own aircraft from the node "n" to the node n+1.

The "change" in surrounding situation to be extracted upon the forgoing determination may be a change in situation that requires a change in flight path when taking into consideration a factor such as a purpose of the flight and safety. Such a change in surrounding situation may include one or both of a change in risk map M (in other words, a change in risk to flight safety) and a change in location of the traveling destination point in the present implementation.

The controller 14 may compare the risk map M at the time at which the own aircraft is to arrive at the node n+1 with the risk map M at the time at which the own aircraft is to arrive at the node "n", and thereby determine whether the surrounding situation involves a change.

When the controller 14 determines that the surrounding situation at the time at which the own aircraft is to arrive at the node n+1 involves no change from the surrounding situation at the time at which the own aircraft is to arrive at the node "n" in step S34 (NO in step S34), the controller 14 may replace the current node "n" with the node n+1 as a new node "n", and the process may proceed to step S31 described above. In other words, a next node n+1 may be newly searched for that is adjacent to the node "n" newly set.

Alternatively, when the controller 14 determines that the surrounding situation at the time at which the own aircraft is to arrive at the node n+1 involves a change from the surrounding situation at the time at which the own aircraft is to arrive at the node "n" in step S34 (YES in step S34), the controller 14 updates the estimated smallest cost value h*. Specifically, the controller 14 updates the estimated smallest cost value h* of a path from each of all of the nodes on which the searching has already been performed to the traveling destination point, on the basis of the surrounding situation at the time at which the own aircraft is to arrive at the node "n+1" (step S35).

Thereafter, the controller 14 may replace the current node "n" with the node n+1 as the new node "n", and the process may proceed to step S31 described above to search for the newly-set next node n+1 adjacent to the newly-set node "n". Upon the searching for the newly-set next node n+1, the searching is performed on the value of cost f* that is updated in accordance with the update of the estimated smallest cost value h*. It is to be noted that the estimated smallest cost value g* is not influenced by a change in the surrounding situation due to a factor such as the change in location of the traveling destination point, and therefore may not need to be updated.

The foregoing update of the estimated smallest cost value h* prevents the estimated smallest cost value h* from being larger than the actual smallest cost value h even in a case where the surrounding situation involves a change due to a factor such as the change in location of the traveling destination point.

The controller 14 may repeatedly perform the foregoing processes in steps S31 to S35 until the node on which the searching is being currently performed corresponds to the traveling destination point in the foregoing manner. The controller 14 may thus search for the optimal flight path from the traveling start point to the traveling destination point.

Further, the controller 14 may update the flight path of the aircraft 1 with the searched optimal flight path.

Analysis Examples

The foregoing operation of the path searching apparatus 10 is described below referring to analysis examples.

FIGS. 4 to 6B are diagrams for describing the analysis examples and each illustrate a flight path FP on the corresponding risk map M as a result of analysis.

It is to be noted that FIGS. 4 to 6B each illustrate the risk to the flight safety by density of hatching (including a region without hatching), where higher density of hatching indicates a higher risk.

The present analysis examples involved searching for the flight path of the aircraft 1 in a case where the aircraft 1 was to travel to a location which allowed for safe monitoring of a leading hindrance H of a group of hindrances H heading north, without entering an influence range of the group of hindrances H.

Two kinds of analysis, i.e., analysis based on the path searching by the path searching apparatus 10 according to the present implementation and analysis based on the path searching by currently-used A-Star algorithm without updating the estimated smallest cost value h* were conducted, and results of the two kinds of analysis were compared with each other.

Figure 4:
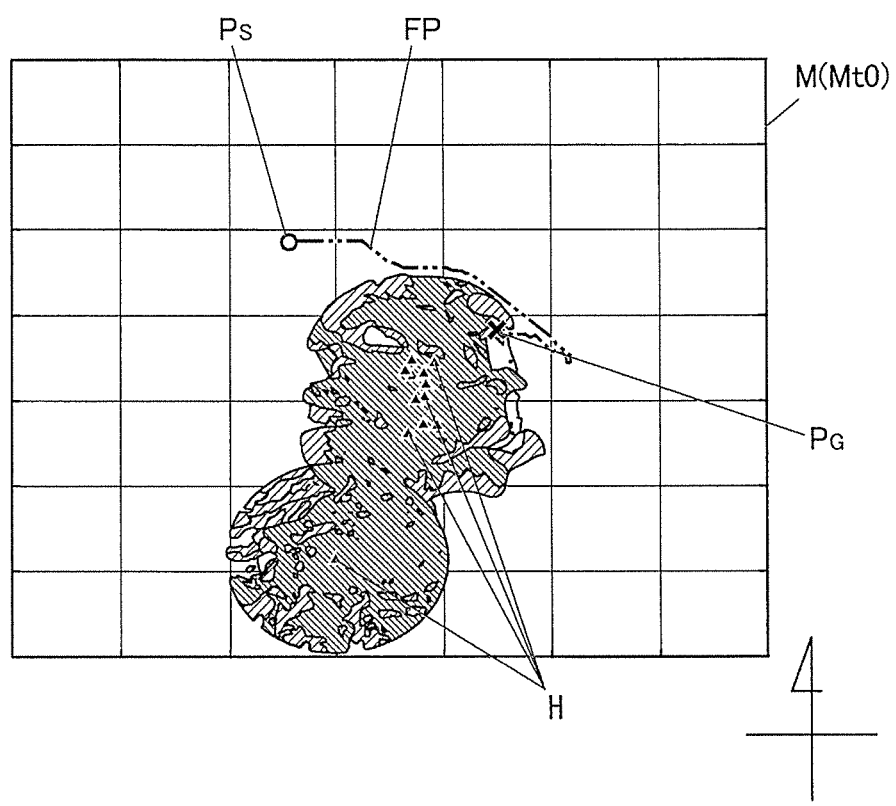
FIG. 4 is a diagram for describing an analysis example.

FIG. 4 illustrates a risk map M(Mt0) at a time when the aircraft 1 started traveling (at a time t0) and the flight path FP at the time when the aircraft 1 started traveling that was searched for by the existing A-Star algorithm.

Referring to FIG. 4, when it was assumed that the surrounding situation involved no change from that at the time when the aircraft 1 started traveling, the optimal path of the aircraft 1 was set to be the flight path FP that led from the traveling start point $P_S$, winding around the north of the group of hindrances H, to the traveling destination point $P_G$ located at the north-east of the group of hindrances H.

It is to be noted that a predetermined region located approximately at the north-east of the leading hindrance H of the group of hindrances H was an appropriate location for monitoring irrespective of passage of time.

Figure 5A:
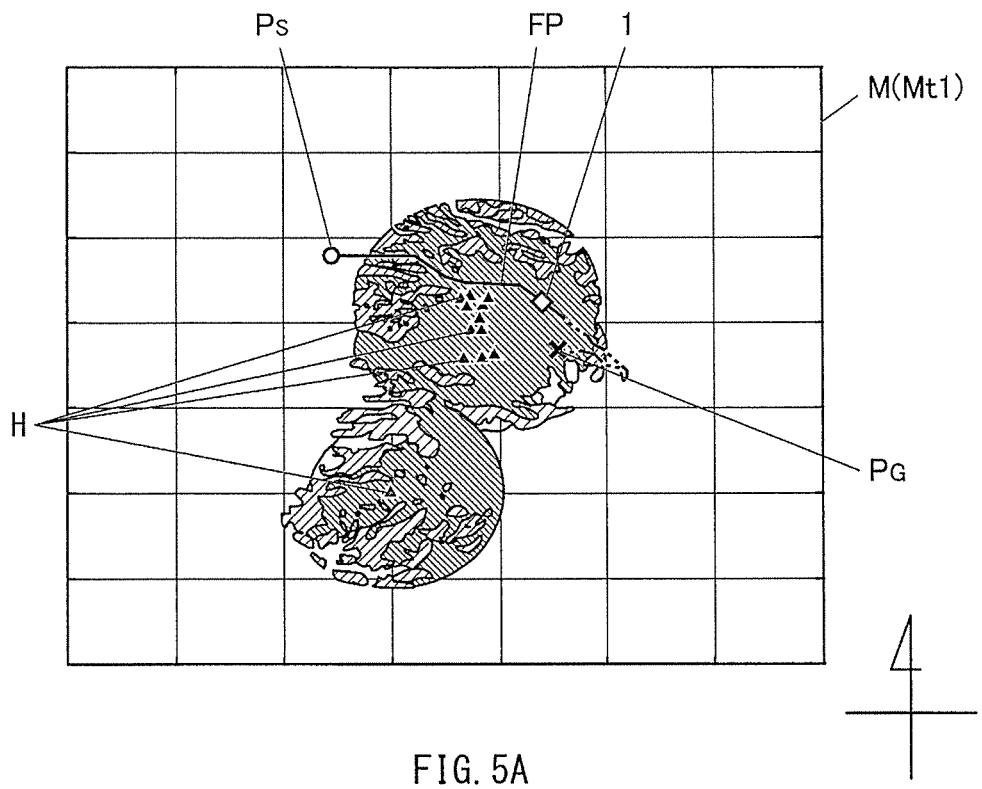
FIGS. 5A and 5B are each a diagram for describing another analysis example.
Figure 5B:
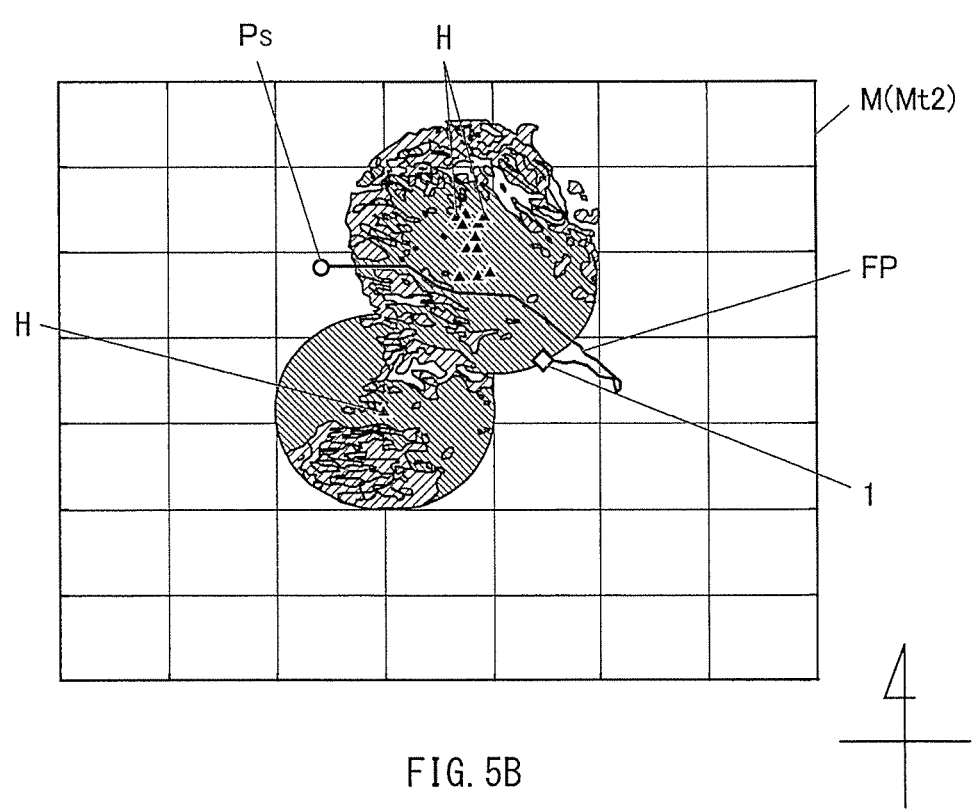

FIGS. 5A and 5B each illustrate a result of the analysis based on the path searching by the currently-used A-Star algorithm. FIG. 5A illustrates a risk map M(Mt1) at a time at which the aircraft 1 was in the middle of the path (at a time t1), and FIG. 5B illustrates a risk map M(Mt2) at a time at which the aircraft 1 was to arrive at the traveling destination point $P_G$ (at a time t2).

Referring to FIGS. 5A and 5B, the path searching by the currently-used A-Star algorithm resulted in the flight path FP the same as that in the case where the surrounding situation was assumed to involve no change from that at the time when the aircraft 1 started traveling. One reason is that the path searching by the currently-used A-Star algorithm did not take into consideration movement of the group of hindrances H in accordance with the passage of time. As a result, the aircraft 1 was to pass a region with a high risk that was close to the group of hindrances H, and was to arrive at the traveling destination point $P_G$ that became farther from the monitoring target (the leading hindrance H of the group of hindrances H) in accordance with the movement of the group of hindrances H.

Figure 6A:
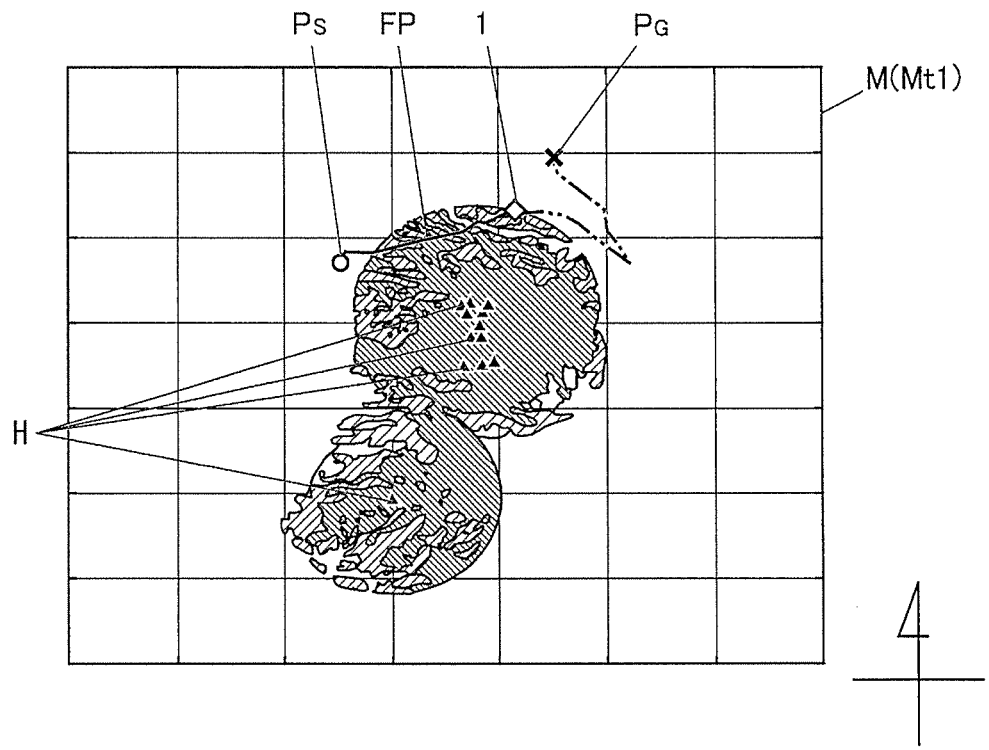
FIGS. 6A and 6B are each a diagram for describing still another analysis example.
Figure 6B:
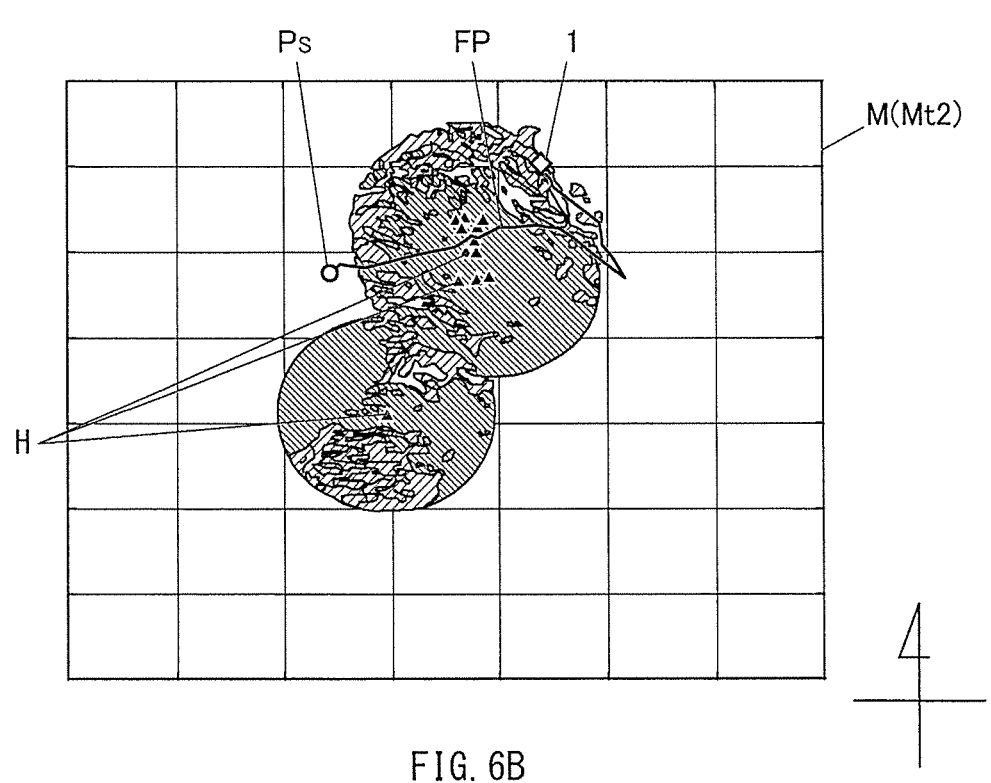

FIGS. 6A and 6B each illustrate a result of the analysis based on the path searching performed by the path searching apparatus 10 according to the present implementation. FIG. 6A illustrates the risk map M(Mt1) at the time at which the aircraft 1 was in the middle of the path (at the time t1), and FIG. 6B illustrates the risk map M(Mt2) at the time at which the aircraft 1 was to arrive at the traveling destination point $P_G$ (at the time t2).

Referring to FIGS. 6A and 6B, the path searching performed by the path searching apparatus 10 involved resetting of the optimal monitoring location in accordance with the movement of the group of hindrances H, resulting in a change in location of the traveling destination point $P_G$ in accordance with the passage of time. However, the path searching was performed taking into consideration the factors such as the change in location of the traveling destination point $P_G$ and the change in risk. This allowed the aircraft 1 to travel along the flight path FP avoiding the region with a high risk and arrive at the traveling destination point $P_G$ appropriate for monitoring.

[Effects]

As described above, according to the present implementation, the path searching by A-Star algorithm involves update of the estimated smallest cost value h* of the node on which the searching has been already performed, when the surrounding situation of the aircraft 1 at the time at which the aircraft 1 is to arrive at the node n+1 on which the searching is being currently performed is determined to involve a change from the surrounding situation of the aircraft 1 at the time at which the aircraft 1 is to arrive at the node "n" located upstream in the travel path from the node n+1.

This makes it possible to prevent the estimated smallest cost value h* from being larger than the actual smallest cost value h even in a case where the surrounding situation involves a change due to a factor such as the change in location of the traveling destination point, guaranteeing the optimal solution. As a result, it is possible to search for the optimal path even in a case where the surrounding situation of the aircraft 1 involves a change.

[Modifications]

It is to be noted that the technology is not limitedly applicable to the foregoing implementations. It should be appreciated that modifications and alterations may be made by persons skilled in the art without departing from the scope as defined by the appended claims.

For example, the description has been given referring to the example in which the path searching apparatus 10 is applied to searching for the flight path of the aircraft 1 in the foregoing implementation. However, the technology is also applicable to searching for a travel path of various movable bodies such as a vehicle and a vessel besides the aircraft.

Moreover, the description has been given referring to the example in which the path searching apparatus 10 is mounted on the aircraft 1. However, the path searching apparatus according to one implementation of the technology may be provided in a facility on the ground. Further, the path searching apparatus according to one implementation of the technology mounted on an aircraft and the path searching apparatus according to one implementation of the technology provided in a facility on the ground may perform a control in association with each other.

The invention claimed is:

1. A path searching apparatus comprising:
a controller; and
a memory comprising 1) information of a path comprising nodes including a start node and a goal node, each of the nodes on the path being associated with a respective cost value derived based on a first estimated cost value and a second estimated cost value, the first estimated cost value associated with a first part of the path extending from the start node to a respective node of the nodes, and the second estimated cost value associated with a second part of the path extending from the respective node of the nodes to the goal node, and 2) instructions that, when executed by the controller, cause the controller to perform a path searching based on A-Star algorithm, the path searching comprising:
extracting, from adjacent nodes of a current node on which the path searching is being currently performed, an adjacent node that has a minimum sum of the first estimated cost value and the second estimated cost value, the adjacent nodes excluding searched nodes on which the path searching has been already performed;
acquiring current surrounding information of a movable body at the current node;
predicting future surrounding information of the movable body for a future time when the movable body is to arrive at the adjacent node;
responsive to determining that the adjacent node is not a current goal node, determining whether the future surrounding information differs from the current surrounding information;
responsive to determining that the future surrounding information differs from the current surrounding information, moving the goal node from the current goal node to a new goal node located at a different location from the current goal node;
responsive to moving the goal node, updating the second estimated cost values of the searched nodes based on the future surrounding information while maintaining the first estimated cost value of the searched nodes; and responsive to updating the second estimated cost values of the searched nodes, replacing the current node with the adjacent node.

2. The path searching apparatus according to claim 1, wherein the current surrounding information includes a current surrounding situation of the movable body,
a probability model used to produce future surrounding situation of the movable body based on the current surrounding information is stored in the memory, and
the future surrounding information is generated based on the future surrounding situation produced by the probability model.

3. The path searching apparatus according to claim 2, wherein
the movable body is an aircraft, and
a difference between the current surrounding information and the future surrounding information includes one or both of a change in risk to flight safety.

4. The path searching apparatus according to claim 1, wherein
the movable body is an aircraft, and
a difference between the current surrounding information and the future surrounding information includes one or both of a change in risk to flight safety.

5. The path searching apparatus according to claim 1, the instructions causes the controller to perform the path searching repeatedly until the current node corresponds to the goal node.

6. A non-transitory tangible recording medium having 1) a path searching program and 2) information of a path comprising nodes including a start node and a goal node, each of the nodes on the path being associated with a respective cost value derived based on a first estimated cost value and a second estimated cost value, the first estimated cost value associated with a first part of the path extending from the start node to a respective node of the nodes, and the second estimated cost value associated with a second part of the path extending from the respective node of the nodes to the goal node, the path searching program causing, when executed by a path searching apparatus, the path searching apparatus to perform a path searching based on A-Star algorithm, the path searching comprising:
extracting, from adjacent nodes of a current node on which the path searching is being currently performed, an adjacent node that has a minimum sum of the first estimated cost value and the second estimated cost value, the adjacent nodes excluding searched nodes on which the path searching has been already performed;
acquiring current surrounding information of a movable body at the current node;
predicting future surrounding information of the movable body for a future time when the movable body is to arrive at the adjacent node;
responsive to determining that the adjacent node is not a current goal node, determining whether the future surrounding information differs from the current surrounding information;
responsive to determining that the future surrounding information differs from the current surrounding information, moving the goal node from the current goal node to a new goal node located at a different location from the current goal node;
responsive to moving the goal node, updating the second estimated cost values of the searched nodes based on the future surrounding information while maintaining the first estimated cost value of the searched nodes; and
responsive to updating the second estimated cost values of the searched nodes, replacing the current node with the adjacent node.

7. The non-transitory tangible recording medium according to claim 6, the instructions causes the controller to perform the path searching repeatedly until the current node corresponds to the goal node.

* * * * *